United States Patent [19]

Plummer

[11] 4,416,514
[45] Nov. 22, 1983

[54] COLOR FILTER

[75] Inventor: William T. Plummer, Concord, Mass.

[73] Assignee: Polaroid Corporation, Cambridge, Mass.

[21] Appl. No.: 205,660

[22] Filed: Nov. 10, 1980

[51] Int. Cl.³ .............................................. G02F 1/13
[52] U.S. Cl. ..................................... 350/335; 350/337
[58] Field of Search ..................... 350/335, 337, 339 F

[56] References Cited

U.S. PATENT DOCUMENTS

| | | |
|---|---|---|
| 2,493,200 | 1/1950 | Land . |
| 2,586,635 | 2/1952 | Fernsler . |
| 2,834,254 | 5/1958 | Sage . |
| 3,652,149 | 3/1972 | Rogers . |
| 3,703,329 | 11/1972 | Castellano ........................ 350/335 X |
| 3,774,988 | 11/1973 | Rogers . |
| 3,936,147 | 2/1976 | Murakami . |
| 3,994,565 | 11/1976 | Van Doorn . |
| 4,025,164 | 5/1977 | Doriguzzi et al. . |
| 4,068,926 | 1/1978 | Nakamura et al. ................. 350/337 |
| 4,139,271 | 2/1979 | Yoda . |
| 4,241,339 | 12/1980 | Ushiyama ....................... 350/337 X |

OTHER PUBLICATIONS

Schadt, M. and Helfrich, W., "Voltage-Dependent Optical Activity of a Twisted Nematic Liquid Crystal," *Applied Phys. Lett.*, vol. 18, No. 4, (Feb. 1971), pp. 127–128.

Scheffer, T. "New Multicolor Liquid Crystal Displays That Use a Twisted Nematic Electro-Optical Cell," *J. Applied Phys.*, vol. 44, No. 11, (Nov. 1973), pp. 4799–4803.

Shimomura, T. et al., "Voltage Controllable Color Formation with a Twisted Nematic Liquid Crystal Cell," *Japan J. Appl. Phys.*, vol. 14, No. 7, (1975), pp. 1093–1094.

Mada, H. and Kobayashi, S. "Electro-Optical Properties of Twisted Nematic Liquid Crystals: An Application to Voltage Controllable Color Formation," *Revue de Physique Applique*, tome 10, (May 1975), pp. 147–151.

Sato, S. and Wada, M. "Liquid Crystal Color Display by DAP-TN Double-Layered Structure," *IEEE Transactions on Electron Devices*, May 1974, pp. 312–313.

Raynes, E. P. and Shanks, I. A. "Fast-Switching Twisted Nematic Electro-Optical Shutter and Colour Filter," *Electronic Letters*, vol. 10, No. 7, (Apr. 1974), pp. 114–115.

*Primary Examiner*—John K. Corbin
*Assistant Examiner*—Richard F. Gallivan
*Attorney, Agent, or Firm*—Francis J. Caufield

[57] ABSTRACT

A variable color filter comprising a plurality of differently colored diochroic polarizers, an equal number of voltage responsive twisted nematic liquid crystal cells, and a plane polarizer all arranged along an optical path in a predetermined manner to modify the spectral content of visible light incident to the filter so that the filter transmits any one of a predetermined number of colors whose saturation and hue are related to the voltages applied to the liquid crystal cells.

31 Claims, 7 Drawing Figures

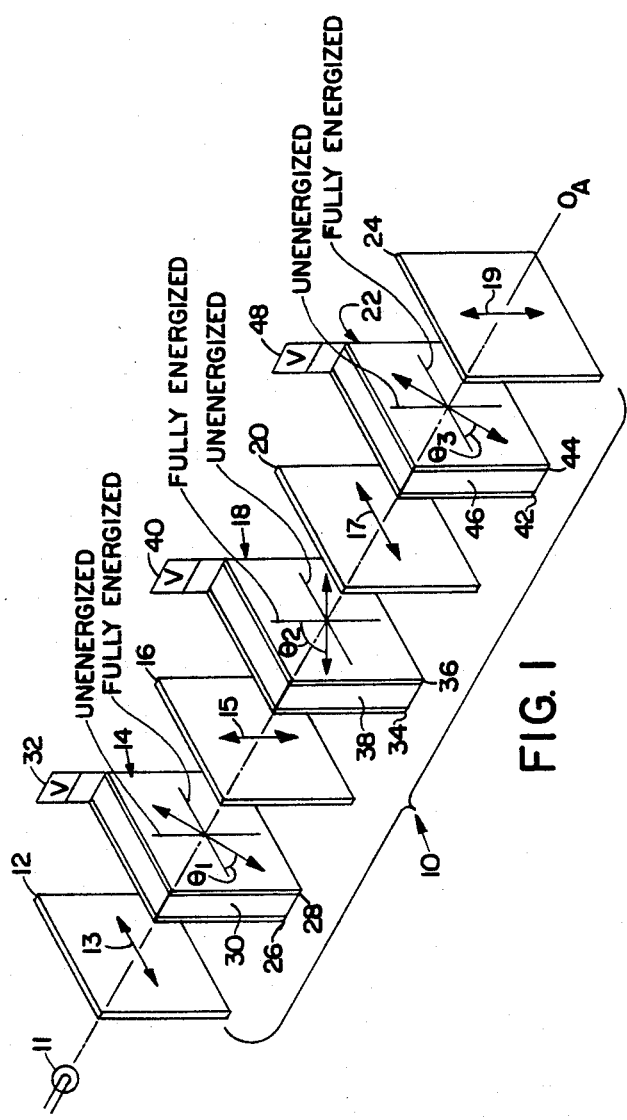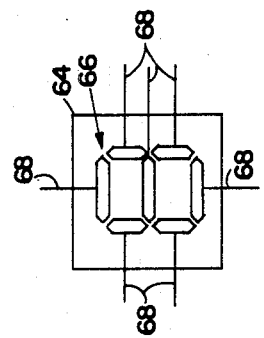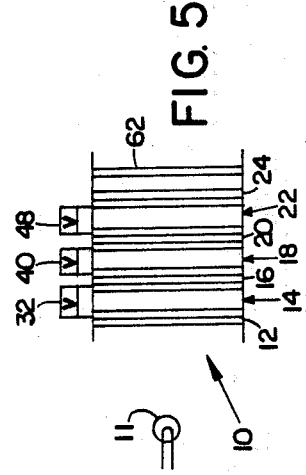

COLOR FILTER

BACKGROUND OF THE INVENTION

1. Field of the Invention

This invention in general relates to filters for modifying the spectral composition of radiant energy and in particular to a filter which preferably utilizes liquid crystals and polarizers to vary the content of radiation in the visible region of the spectrum to provide any one of a predetermined number of colors.

2. Description of the Prior Art

Color filters are well-known in the photographic and optical arts and include devices and materials which deliberately change the spectral intensity distribution and/or state of polarization of electromagnetic radiation incident upon them for purposes of synthesizing color(s).

One commonly known class of filter, called absorption filters, utilizes chemical dyes dissolved in suitable media such as gelatin or plastic to selectively absorb or remove certain wavelengths of incident radiation, either partially or completely, such that the remaining radiation transmitted by the filter is a desired color. Other known filters utilize thin coatings or films of various substances to create interference effects to synthesize color and are thus referred to as interference filters. Dichroic filters also are well-known being those which selectively absorb radiation polarized in one direction more strongly than that polarized in other directions.

Also well-known are materials, such as ammonium dihydrogen phosphate (ADP) and potassium dihydrogen phosphate (KDP), which become optically active in the presence of external magnetic and electric fields. Such materials have been variously combined with plane polarizers and dichroic polarizing filters to provide multicolor filter devices which are capable of producing more than one color in response to an applied electrical or magnetic field.

In the patent literature a number of examples of multicolor filter devices exist. These include U.S. Pat. No. 2,493,200 issued to E. H. Land on Jan. 3, 1950 and entitled "Variable Polarizing Color Filter". The Land patent discloses a color filter which combines a plurality of dichroic polarizers, a plane polarizer, and a plurality of Kerr cells comprising ADP which are arranged to operate as fractional wave retardation plates.

Another example is U.S. Pat. No. 4,068,926 issued to Kenji Nakamura on Jan. 17, 1978 where there is disclosed a twisted nematic liquid crystal cell sandwiched between an achromatic linear polarizer and a colored linear polarizer. This combination is arranged to display colored patterns having light-on-colored or colored-on-light image-background combinations.

A further example of the use of the properties of ADP materials operating as fractional wave retardation plates in combination with polarizers is described in U.S. Pat. No. 2,834,254 issued to Stanley J. Sage on May 13, 1958 and entitled "Electronic Color Filter".

A mechanically operable variable color filter comprising composite chromatic polarizing components, an acromatic polarizing filter, and a quarter-wave retardation plate is described in U.S. Pat. No. 3,936,147 issued to Sanjiro Murakami on Feb. 3, 1976 and entitled "Variable Characteristic Light Filter".

In U.S. Pat. No. 3,994,565 issued to Van Doorn et al. on Nov. 30, 1976 and entitled "Device For Displaying Characters Having A Twisted Nematic Liquid Crystal", two sources of colored light, linearly polarized in different planes, are combined with a liquid crystal having a twisted nematic configuration to display characters on differently colored backgrounds.

A preferred arrangement for a dichroic polarizer, a liquid crystal, a plane polarizer, and a mirror which are configured as a colored display is described in U.S. Pat. No. 4,025,164 issued to Doriguzzi et al. on May 24, 1977 and entitled "Liquid Crystal Display Device For Colored Display Of Information With A Selective Polarizer".

In U.S. Pat. No. 2,586,635 issued to G. L. Fernside on Feb. 19, 1952 and entitled "Color Control Systems", there is described a color filter comprising a combination of a plane polarizer, polarized color filters and birefringent polarization rotators.

And in an article entitled "New Multicolor Liquid Crystal Displays That Use A Twisted Nematic Electrooptical Cell" by Terry J. Scheffer, which appeared in the J. Applied Physics, vol. 44, no. 11, in November 1973, there is described two- and four-color displays which utilize polarizers, liquid crystals, and optical retardation plates.

As evidenced by the aforementioned examples of multicolor filter devices, it is clear that the cynthesis of color is of fundamental importance in the optical and photographic arts. Because of this, it is a primary object of the present invention to provide a color filter for varying the spectral composition of radiant energy to produce a predetermined number of colors.

It is another object of the present invention to provide a color filter for continuously varying the spectral composition of radiant energy to provide any one of a gamut of colored light.

It is another object of the present invention to provide an electro-optical color filter by which any one of a gamut of colors can be produced.

It is yet another object of the present invention to provide a color filter having improved color saturation and hue control through the use of a preferred arrangement of plane polarizers, dichroic polarizers, and polarization rotators.

Other objects of the invention will in part be obvious and will in part appear hereinafter. The invention accordingly comprises the apparatus possessing the construction, the combination of elements, and arrangement of parts which are exemplified in the following detailed disclosure.

SUMMARY OF THE INVENTION

This invention in general relates to filters for modifying the spectral composition of radiant energy and in particular to a filter which preferably utilizes liquid crystals and polarizers to vary the content of radiation in the visible region to provide any one of a predetermined number of colors.

The filter of the invention comprises a plurality of differently colored dye polarizing elements stationed along an optical path to intercept light traveling therealong. Each dye polarizing element includes a dye for absorbing a different part of the visible spectrum and is structured for plane polarizing that part of the visible spectrum which is absorbed by the dye therein while transmitting the nonabsorbed part of the visible spectrum unpolarized.

Additionally included is a plane polarizer which is also stationed along the optical path and polarizes substantially uniformly all wavelengths of the visible spectrum.

A plurality of voltage responsive twisted nematic liquid crystal cells, one for each of the dye polarizing elements, are also included in the filter. The twisted nematic liquid crystals are stationed along the optical path and are structured for varying the rotation of linearly polarized light from 0-degrees to 90-degrees in accordance with the voltage applied thereto.

The dye polarizing elements, the plane polarizer, and the twisted nematic liquid crystal cells are arranged along the optical path in a predetermined manner to modify the spectral content of visible light incident to the filter so that the filter transmits any one of a predetermined number of colors whose saturation and hue are related to the voltages applied to the twisted nematic liquid crystal cells.

In the preferred embodiment of the filter there are three dye polarizing elements one of which includes a magenta dye which absorbs and plane polarizes green light while transmitting red and blue light unpolarized, another of which includes a cyan dye which absorbs and plane polarizes red light while transmitting blue and green light unpolarized, and the third of which absorbs and plane polarizes blue light while transmitting green and red light unpolarized.

The preferred arrangement of the elements of the filter along the optical path thereof is the following order: the magenta dye polarizing element, one of the twisted nematic liquid crystal cells, the plane polarizer, another of the liquid crystal cells, the cyan dye polarizing element, the third of the liquid crystal cells, and then the yellow dye polarizing element.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 1 is an exploded perspective view of the color filter of the invention;

FIG. 5 is a side elevation of the color filter of FIG. 1 shown in combination with a reflector;

FIG. 6 is a plane view showing a modification that can be made to the filter of FIG. 1 to display numeric characters.

DESCRIPTION OF THE PREFERRED EMBODIMENT

Figure 2:
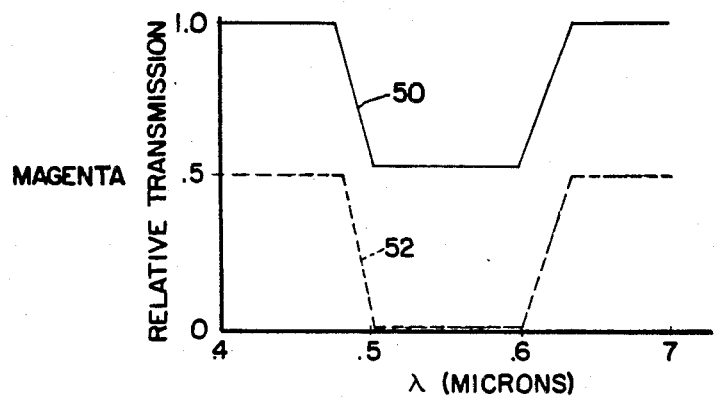
FIGS. 2, 3, and 4 are graphs showing spectral transmission characteristics of various components of the filter of FIG. 1.

Referring now to FIG. 1, there is shown at 10 the preferred embodiment of the color filter of the invention. The filter 10 operates in a manner to be described to selectively vary the spectral composition of visible light incident thereupon from a radiant source, such as the bulb indicated diagrammatically at 11, to transmit a predetermined number of colors of different saturation and hue. To accomplish this, the preferred structure of the filter 10 comprises, from left to right along an optical axis, OA, thereof, a magenta dye polarizer 12, a first liquid crystal cell 14, an ordinary linear or plane polarizer 16, a second liquid crystal cell 18, a cyan dye polarizer 20, a third liquid crystal cell 22, and a yellow dye polarizer 24.

The dye polarizers (12, 20 and 24) each preferably comprises a stretched polyvinyl alcohol sheet treated in a well-known manner with an absorbing dye so that each dye polarizer absorbs a different part of the visible spectrum and plane polarizes that part of the visible spectrum which is absorbed by the dye therein while transmitting the nonabsorbed part of the visible spectrum unpolarized. For this purpose, the dye polarizers (12, 20 and 24) can be fabricated and dyes for them selected in the manner described, for example, in U.S. Pat. No. 2,328,219 issued to E. H. Land on Aug. 31, 1943 and entitled "Light Polarizer and Process of Manufacture" and U.S. Pat. No. 4,025,164 issued to Doriguzzi et al. on May 24, 1977 and entitled "Liquid Crystal Display Device For Colored Display Of Information With A Selective Polarizer".

Figure 3:
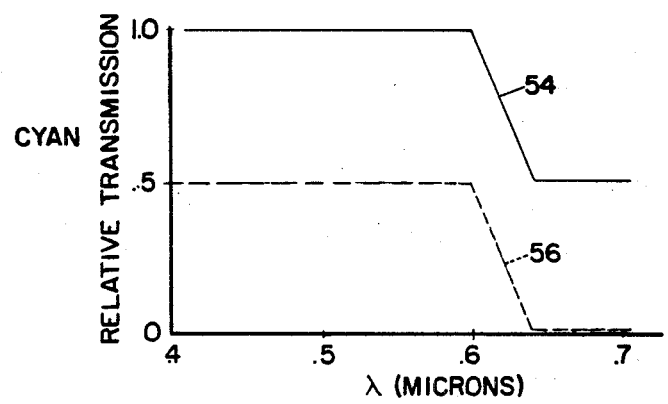
Figure 4:
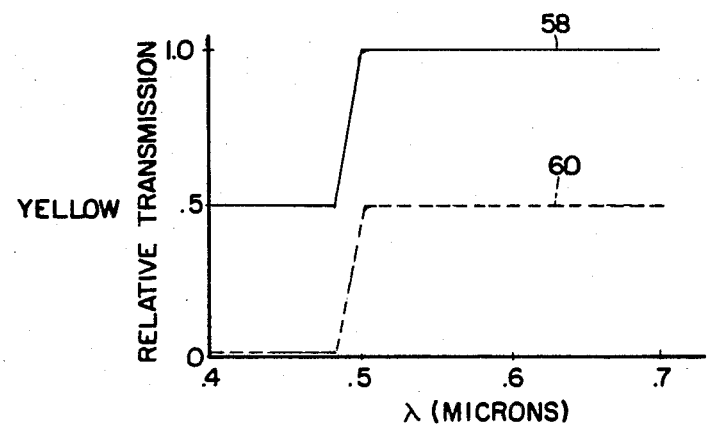

The preferred relative transmission characteristics of the dye polarizers (12, 20 and 24) are represented by the curves 50, 54 and 58 respectively in FIGS. 2, 3 and 4. As those skilled in the art will recognize, the relative transmission characteristics for each dye polarizer represents the absorption spectra shape for the particular dye incorporated therein. Absolute transmission characteristics which may be desired for a particular application can be easily controlled in a well-known manner through the use of appropriate dye concentration levels.

The dye polarizer 12 is preferably provided with a magenta dye and plane polarizes green light (approximately 0.5 to 0.6 microns) while transmitting blue light (approximately 0.4 to 0.5 microns) and red light (approximately 0.6 to 0.7 microns) unpolarized. The transmission axis of the dye polarizer 12, which is designated at 13 in FIG. 1, is preferably arranged horizontally so that green light is polarized thereby in a plane parallel to the transmission axis 13.

The dye polarizer 20 is provided with a cyan dye and plane polarizes and absorbs red light while transmitting blue and green light unpolarized. The transmission axis of the dye polarizer 20, which is designated at 17 in FIG. 1, is also arranged horizontally and therefore blue light is polarized thereby in a plane which is both parallel to the transmission axis 17 and also to the transmission axis 13 of the dye polarizer 12.

The dye polarizer 24 is provided with a yellow dye and absorbs and plane polarizes blue light while transmitting, unpolarized, green and red light. The transmission axis of the dye polarizer 24, which is designated at 19 in FIG. 1, is arranged vertically so that blue light polarized thereby exits the dye polarizer 24 in a plane which is parallel to its transmission axis 19.

The plane polarizer 16 is stationed along the optical axis, OA, of the filter 10 and operates in a well-known manner to plane polarize substantially uniformly all wavelengths of the visible spectrum. The transmission axis of the plane polarizer 16, which is designated at 15 in FIG. 1, is arranged vertically. Thus arranged, the dye polarizers (12, 20 and 24) and the plane polarizer 16 are positioned with respect to one another with their polarizing transmission axes at angular increments of 90-degrees azimuth.

The liquid crystal cells 14, 18, 22, are of the twisted nematic type described in more detail, for example, in an article authored by M. Schadt and W. Helfrich which appeared in the *Applied Physics Letters*, vol. 18, no. 4, 15 February 1971, and entitled "Voltage-Dependent Optical Activity Of A Twisted Nematic Liquid Crystal". Each liquid crystal cell 14, 18, 22, comprises a suitable nematic liquid crystal material which is placed between two glass plates each of which is provided with a conductive coating. In FIG. 1, the liquid crystal material for the cell 14 is designated at 30 and its glass plates with appropriate conductive control layers thereon are designated at 26 and 28; the liquid crystal material for the cell 18 is designated at 38 while its glass plates with conductive coatings thereon are designated at 34 and 36; and the liquid crystal material for the cell 22 is designated at 46 while its glass plates with conductive coatings thereon are designated at 42 and 44. The liquid crystal cells, 14, 18 and 22, operate in the manner described in the aforementioned article to vary the rotation of linearly polarized light continuously from 0-degrees to 90-degrees in accordance with the voltage applied across their respective conducting layers. The required voltages can be applied to the respective conductive coatings of the liquid crystal cells, 14, 18 and 22, by well-known variable voltage sources such as those designated diagrammatically at 32, 40 and 48.

Each of the liquid crystal cells, 14, 18 and 22, is arranged to cause a 90-degree rotation of the axis of polarization for the entire spectrum when not energized and when fully energized to transmit plane polarized light without rotation. For voltages less than a predetermined level which represents the fully-energized state, plane polarized light incident upon any of the liquid crystal cells, 14, 18, 22, is rotated through an angle less than 90-degrees as designated respectively at $\theta_1$, $\theta_2$, and $\theta_3$ (FIG. 1). The angles, $\theta_i$, depend on the voltage applied to the respective liquid crystal cells, 14, 18 and 22.

Each of the dye polarizers 12, 20 and 24, is arranged in the foregoing manner with respect to the plane polarizer 16 so that any one of the dye polarizers (12, 20 or 24) in combination with the plane polarizer 16 transmits the entire visible spectrum when the plane of polarization of the light absorbed by the dye polarizer is parallel to the transmission axis of the plane polarizer 16 and transmit its designated color, i.e. magenta, cyan and yellow, by absorbing the complement thereof when the plane of polarization of the absorbed light is crossed, i.e. rotated by the angles, $\theta_i$, via the liquid crystal cells, 14, 18 and 22, with the transmission axis of the plane polarizer 16.

The curve 52 in FIG. 2 represents the color transmitted by the magenta dye polarizer 12 when crossed with the plane polarizer 16 via the fully energized liquid cell 14; the curve 56 of FIG. 3 represents the color transmitted by the cyan dye polarizer 20 when crossed with the plane polarizer 16 via the fully energized liquid crystal cell 18; and the curve 60 of FIG. 4 represents the color transmitted by the yellow dye polarizer 24 when crossed with the plane polarizer 16 via the fully energized liquid crystal cell 22.

When the liquid crystal cells (14, 18 and 22) are not energized, their respective control layers each cause a 90-degree rotation of the axis of polarization for the entire spectrum. For this condition, the magenta filter 12 is thus optically parallel to the transmission axis of the plane polarizer 16 and only partially absorbs green light; the cyan dye polarizer 20 is optically parallel to the transmission axis of the plane polarizer 16 and absorbs no light because all three colors emerge from the plane polarizer 16 parallel to its axis 15 and are then rotated by 90-degree by the liquid crystal cell 40 so that they are parallel to the transmission axis 17 of the cyan dye polarizer 20; and the yellow dye polarizer 24 is optically parallel to the transmission axis of the plane polarizer 16 and absorbs no light because all three colors emerge from the cyan dye polarizer 20 parallel to its transmission axis 17 and are then rotated by 90-degrees by the liquid crystal cell 22 so that they are parallel to the transmission axis 19 of the dye polarizer 24. However, when each of the liquid crystal cells 14, 18 and 22 is fully energized as illustrated in FIG. 1, the liquid crystal material loses its "twist" and each of the cells, 14, 18 and 22, passes polarized light without rotation. Thus, when all three liquid crystal cells (14, 18 and 22) are fully energized, the magenta dye polarizer 12 and the cyan dye polarizer 20 in combination with the plane polarizer 16 will absorb green and red light and take on the relative transmission characteristics as specified respectively by the curves 52 and 56 in FIGS. 2 and 3, but the yellow dye polarizer 24 is still optically parallel to the plane polarizer 16 because there are two 90-degree rotations between them. Thus, the result of all three liquid crystal cells (14, 18 and 22) being fully energized is the color blue. The colors which result from all eight possible conditions of fully energized and unenergized states for the three liquid crystal cells (14, 18 and 22) are summarized in Table 1 as follows:

TABLE I

| Liquid Crystal Cell | | | |
| --- | --- | --- | --- |
| 14 | 18 | 22 | COLOR |
| OFF | OFF | OFF | White |
| OFF | OFF | ON | Yellow |
| OFF | ON | OFF | Green |
| OFF | ON | ON | Cyan |
| ON | OFF | OFF | Magenta |
| ON | OFF | ON | Red |
| ON | ON | OFF | Black |
| ON | ON | ON | Blue |

The filter 10 in addition to providing the colors listed in Table I can create any color display which is within the dye gamut offered by the dye polarizers 12, 20, and 24. These other colors can be achieved by applying to the liquid crystal control cells 14, 18 and 22 appropriate voltage levels which are below the predetermined level of their fully energized state. It will be recalled that the angles through which plane polarized light are rotated depend on the voltage applied to the liquid crystal cells 14, 18 and 22 and are designated respectively as $\theta_1$, $\theta_2$ and $\theta_3$. Given that the three rotation angles are designated by $\theta_1$, $\theta_2$ and $\theta_3$, then the red, green and blue transmissions for the filter 10 are as follows:

$T_{green} = \sin^2\theta_1$ $T_{red} = \sin^2\theta_2$ $T_{blue} = \sin^2(\theta_2 + \theta_3)$, To provide full and continuous adjustment of $T_{blue}$ from 0 to 100% transmission, $\theta_3$ must have a range of 180° rather than 90°. This may be accomplished by replacing the liquid crystal cell 22 with a pair of such cells in tandem each of which rotates plane polarized light through 90°. With such a tandem cell in place of the cell 22, the colors listed in Table I would still be available through the use of two appropriate voltage levels for the tandem cell to provide a 0° or 90° rotation.

The preferred embodiment for the filter 10 preferably has the magenta dye polarizer 12 on one side of the plane polarizer 16 because its absorption is central in the visible spectrum. With this arrangement, the cyan dye polarizer 20 and the yellow dye polarizer 24, which are together on the opposite side of the plane polarizer 16, have the greatest possible lack of overlap of their spectral absorption characteristics.

In the foregoing manner, the dye polarizers (12, 20 and 24), the plane polarizer 16, and the twisted nematic liquid crystal cells (14, 18 and 22) have been arranged along the optical path, OA, of the filter 10 in a predetermined manner to modify the spectral content of visible light incident to the filter 10 so that the filter 10 transmits any one of a predetermined number of colors whose saturation and hue are related to the voltages applied to the twisted nematic liquid crystal cells (14, 18 and 22).

The present invention operates in a manner similar to a subtractive color mixing system wherein different amounts of dye in the color mixing system are simulated in the present invention by the aforementioned polarization changes. Color saturation is controlled by how much the liquid crystal cells, 14, 18 and 22, are rotated, and hue is controlled by which dye polarizers, 12, 20 and 24, are crossed with the linear polarizer 16. What is most significant about the color filter 10 is that it can be used to adjust both saturation and hue over a substantial range.

Referring now to FIG. 5, there is shown therein the preferred embodiment of the filter 10 of the invention in combination with a mirror 62 which is placed to the right of the yellow dye polarizer 24 of the filter 10. With the addition of the mirror 62, the filter 10 can be used in a reflection mode because light reflected from the mirror 62 is treated in the same manner after having been reflected off the mirror 62 as though it were light transmitted through the filter 10 by the source 11. The net effect on the color of light reflected from the mirror 62 is the same as if the light 11 were in place of the mirror 62.

The filter 10 may be modified in a well-known manner to transmit alphanumeric information in color. This can be accomplished as illustrated in FIG. 6 by arranging the conductive layer in the form of a well-known seven-segment pattern designated at 66 on a glass plate of a liquid crystal cell such as that designated at 64 in FIG. 6. Different areas of the pattern 66 can be individually controlled through a plurality of leads 68 which can be selectively actuated in an appropriate manner by well-known electronic devices for this purpose. The pattern 66 or similar alphanumeric pattern can be placed in each of the plates of the liquid crystal cells, 14, 18 and 22, in alignment with one another along the optical axis, OA, and selectively actuated in the manner previously described.

Figure 7:
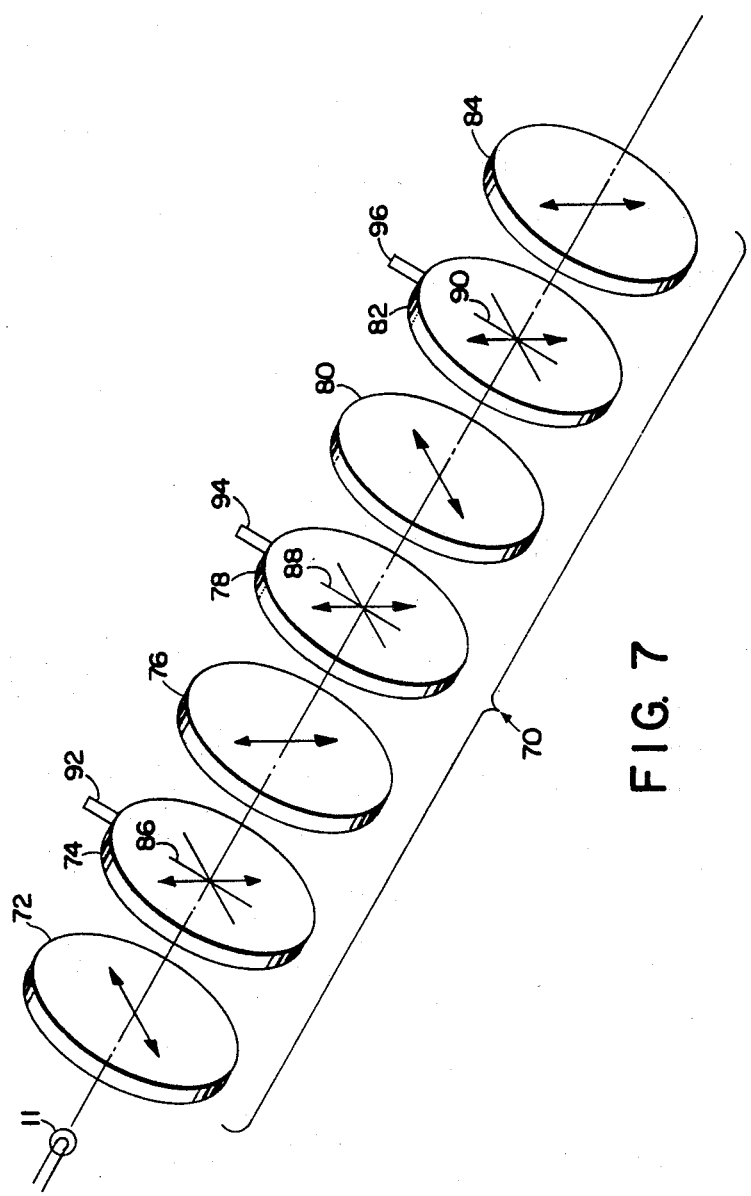
FIG. 7 is an exploded diagrammatic perspective of an alternate filter arrangement having elements in common with the filter of FIG. 1.

Referring now to FIG. 7, there is shown at 70 an alternate embodiment for the preferred arrangement of the dye polarizers and plane polarizer of the invention. In the filter 70, the magenta dye polarizer is designated at 72, the plane polarizer at 76, the cyan dye polarizer at 80 and the yellow dye polarizer at 84—all arranged as previously described with respect to the preferred embodiment of the invention. Between the magenta dye polarizer 72 and the plane polarizer 76 is placed a well-known halfwave plate 74 which can be manually rotated through the use of an appropriate handle 92; between the plane polarizers 76 and the cyan dye polarizer 80 is placed another halfwave plate which is designated at 78 and includes a handle 94 for manual rotation thereof; and between the cyan dye polarizer 80 and the yellow dye polarizer 84 is a third halfwave plate which is designated at 82 and includes a handle 96 for manual rotation thereof. As is well-known in the optical arts, halfwave plates such as those designated at 74, 78 and 82 operate to convert linearly polarized light into linearly polarized light with a different azimuth. Moreover, if either the fast axis or the mutually perpendicular slow axis of a halfwave plate is aligned with plane polarized light, the plane polarized light passes through the halfway plate unchanged. However, when the fast or slow axis of a halfway plate is misaligned with the plane of polarization of plane polarized light, then the halfwave plate will rotate the angle of polarization by an amount which is twice the angle between the planes of the plane polarized light and the plane of the fast or slow axis of the halfwaveplate. The fast axes of the halfwave plates (74, 78 and 82) are designated in FIG. 7 at 86, 88, and 90 respectively and are arranged to operate in the manner of the liquid crystal cells in the preferred embodiment of the invention when in their unenergized state. Manual rotation of the halfwaveplates (92, 94, 96) creates the same effect in the filter 70 as did the liquid crystal cells of the filter 10.

Certain changes may be made in the above-described embodiments without departing from the scope of the invention and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. A filter for varying the spectral composition of visible light, said filter comprising:

a plurality of different dichroic polarizers stationed along an optical path to intercept light traveling therealong, each of said dichroic polarizers structured for selectively plane polarizing a different part of the visible spectrum while transmitting the remainder of the visible spectrum unpolarized;

a plane polarizer stationed along said optical path for polarizing substantially uniformly all wavelengths of the visible spectrum; and a plurality of voltage responsive twisted nematic liquid crystals one for each of said dichroic polarizers, said twisted nematic liquid crystals being stationed along said optical path and structured for varying the rotation of linearly polarized light in accordance with the voltage applied thereto, said dichroic polarizers, said plane polarizer, and said twisted nematic liquid crystals being arranged along said optical path in a predetermined sequence and azimuthal orientation to modify the spectral content of visible light incident to said filter so that said filter transmits any one of a predetermined number of colors whose saturation and hue are related to the voltages applied to said twisted nematic liquid crystals.

2. The filter of claim 1 wherein there are three of said dichroic polarizers one of which includes a magenta dye and plane polarizes green light while transmitting red and blue light unpolarized, another of which includes a cyan dye and plan polarizes red light while transmitting blue and green light unpolarized, and the third of which includes a yellow dye and plane polarizes blue light while transmitting green and red light unpolarized.

3. The filter of claim 2 wherein each of said dye polarizing elements is arranged with respect to said plane polarizer so that any one of said dye polarizers in combination with said plane polarizer will transmit the entire visible spectrum when the plane of polarization of the light absorbed by said dye polarizer is parallel to the transmission axis of said plane polarizer and will transmit its designated color by absorbing the complement thereof when the plane of polarization of the absorbed light is crossed with the transmission axis of said plane polarizer.

4. The filter of claim 3 wherein said dichroic polarizers and said twisted nematic liquid crystals are arranged as adjacent pairs and said plane polarizer is positioned intermediate said pairs at a predetermined location.

5. The filter of claim 4 wherein said dichroic polarizer and said plane polarizer are positioned with respect to one another with their polarizing transmission axes at angular increments of 90-degrees azimuth.

6. The filter of claim 5 wherein each of said twisted nematic liquid crystals is arranged to cause a 90-degree rotation of the axis of polarization for the entire spectrum when not energized and when fully energized to transmit plane polarized light without rotation.

7. The filter of claim 6 wherein said elements thereof are arranged along said optical path thereof in the following order: said magenta dichroic polarizer, one of said twisted nematic liquid crystals, said plane polarizer, another of said liquid crystals, said cyan dichroic polarizer, the third of said liquid crystals, and then said yellow dichroic polarizer.

8. The filter of claim 1 additionally including a mirror arranged on one side thereof so that light transmitted through said filter is intercepted by said mirror and reflected thereby, so that at least a portion of the light incident on said mirror is retroreflected thereby back through said filter.

9. The filter of claims 1 or 8 wherein said liquid crystals are further structured so that said filter can selectively transmit said predetermined number of colors in alphanumeric form.

10. A filter for continuously varying the spectral composition of visible light, said filter comprising:
   a plurality of different dichroic polarizers stationed along an optical path to intercept light traveling therealong, each of said dichroic polarizers structured for plane polarizing a different part of the visible spectrum while transmitting the remainder of the visible spectrum unpolarized;
   a plane polarizer stationed along said optical path for polarizing substantially uniformly all wavelengths of the visible spectrum; and
   a plurality of voltage responsive twisted nematic liquid crystals one for each of said dichroic polarizers, said twisted nematic liquid crystals being stationed along said optical path and structured for varying the rotation of linearly polarized light continuously from 0-degrees to 90-degrees in accordance with the voltage applied thereto,
   said dichroic polarizers, said plane polarizer, and said twisted nematic liquid crystals being arranged along said optical path in a predetermined sequence and azimuthal orientation to modify the spectral content of visible light incident to said filter so that said filter transmits any one of a gamut of colored light whose saturation and hue are related to the voltages applied to said twisted nematic liquid crystals.

11. The filter of claim 10 wherein there are three of said dichroic polarizers one of which includes a magenta dye and plane polarizes green light while transmitting red and blue light unpolarized, another of which includes a cyan dye and plane polarizes red light while transmitting blue and green light unpolarized, and the third of which includes a yellow dye and plane polarizes blue light while transmitting green and red light unpolarized.

12. The filter of claim 11 werein each of said dichroic polarizers is arranged with respect to said plane polarizer so that any one of said dichroic polarizers in combination with said plane polarizer transmits the entire visible spectrum when the plane of polarization of the light absorbed by said dye polarizer is parallel to the transmission axis of said plane polarizer and transmits its designated color by absorbing the complement thereof when the plane of polarization of the absorbed light is crossed with the transmission axis of said plane polarizer.

13. The filter of claim 11 wherein said dichroic polarizers and said twisted nematic liquid crystals are arranged as adjacent pairs and said plane polarizer is positioned intermediate said pairs at a predetermined location.

14. The filter of claim 12 wherein said dichroic and said plane polarizer are positioned with respect to one another with their polarizing transmission axes at angular increments of 90-degrees azimuth.

15. The filter of claim 14 wherein each of said twisted nematic liquid crystals is arranged to cause a 90-degree rotation of the axis of polarization for the entire spectrum when not energized and when fully energized to transmit plane polarized light withough rotation.

16. The filter of claim 15 wherein said elements thereof are arranged along said optical path thereof in the following order: said magenta dichroic polarizer, one of said twisted nematic liquid crystals, said plane polarizer, another of said liquid crystals, said cyan dichroic polarizer, the third of said liquid crystals, and then said yellow dichroic polarizer.

17. The filter of claim 10 additionally including a mirror on one side thereof so that light transmitted through said filter is intercepted by said mirror and reflected thereby so that at least a portion of the light incident on said mirror is retroreflected thereby back through said filter.

18. The filter of claims 10 or 17 wherein said liquid crystals are further structured so that said filter can selectively transmit said gamut of colors in alphanumeric form.

19. A filter for varying the spectral composition of visible light, said filter comprising:
   a plurality of different dichroic polarizers stationed along an optical path to intercept light traveling therealong, each of said dichroic polarizers structured for plane polarizing a different part of the visible spectrum while transmitting the remainder of the visible spectrum unpolarized;

a plane polarizer stationed along said optical path for polarizing substantially uniformly all wavelengths of the visible spectrum; and a plurality of voltage responsive twisted nematic liquid crystals one for each of said dichroic polarizers, said twisted nematic liquid crystals being stationed along said optical path and structured for rotating linearly polarized light between either one of two planes whose azimuths are separated by 90 degrees from one another in response to the application of said voltage thereto, said dichroic polarizers, said plane polarizer, and said twisted nematic liquid crystals being arranged along said optical path in a predetermined sequence and azimuthal orientation to modify the spectral content of visible light incident to said filter so that said filter transmits any one of a predetermined number of colors not to exceed the maximum possible combination of voltage states for said liquid crystals and whose saturation and hue are related to the combination of said twisted nematic liquid crystals to which said predetermined voltage is applied.

20. The filter of claim 19 wherein there are three of said dichroic polarizers one of which includes a magenta dye and plane polarizes green light while transmitting red and blue light unpolarized, another of which includes a cyan dye and plane polarizes red light while transmitting blue and green light unpolarized, and the third of which includes a yellow dye and plane polarizes blue light while transmitting green and red light unpolarized.

21. The filter of claim 20 wherein each of said dichroic polarizers is arranged with respect to said plane polarizer so that any one of said dichroic polarizers in combination with said plane polarizer transmits the entire visible spectrum when the plane of polarization of the light absorbed by said dye polarizer is parallel to the transmission axis of said plane polarizer and transmits its designated color by absorbing the complement thereof when the plane of polarization of the absorbed light is crossed with the transmission axis of said plane polarizer.

22. The filter of claim 20 wherein said dichroic polarizers and said twisted nematic liquid crystals are arranged as adjacent pairs and said plane polarizer is positioned intermediate said pairs at a predetermined location.

23. The filter of claim 22 wherein said dichroic polarizer and said plane polarizer are positioned with respect to one another with their polarizing transmission axes at angular increments of 90-degrees azimuth.

24. The filter of claim 23 wherein each of said twisted nematic liquid crystals is arranged to cause a 90-degree rotation of the axis of polarization for the entire spectrum when not energized and when energized to transmit plane polarized light without rotation.

25. The filter of claim 24 wherein said elements thereof are arranged along said optical path thereof in the following order: said magenta dichroic polarizer, one of said twisted nematic liquid crystals, said plane polarizer, another of said liquid crystals, said cyan dichroic polarizer, the third of said liquid crystals, and then said yellow dichroic polarizer.

26. The filter of claim 19 additionally including a mirror arranged on one side thereof so that light transmitted said filter is intercepted by said mirror and reflected thereby, so that at least a portion of the light incident on said mirror is retroreflected thereby back through said filter.

27. The filter of claims 19 or 26 wherein said liquid crystals are further structured so that said filter can selectively transmit said predetermined number of colors in alphanumeric form.

28. A filter for continuously varying the spectral composition of visible light, said filter comprising:

a first dichroic polarizer stationed along an optical path to intercept light transmitted therealong, said first dichroic polarizer including a magenta dye and structured for plane polarizing green light while transmitting blue and red light unpolarized;

first means stationed along said optical path adjacent said first dichroic polarizer for selectively varying the rotation of linearly polarized light continuously from 0-degrees to 90-degrees;

a plane polarizer stationed adjacent said first means along said optical path for polarizing substantially uniformly all wavelengths of the visible spectrum;

second means stationed along said optical path adjacent said plane polarizer for selectively varying the rotation of linearly polarized light continuously from 0-degrees to 90-degrees;

a second dichroic polarizer stationed along said optical path adjacent said second means, said second dichroic polarizer including a cyan dye and structured to plane polarize red light while transmitting blue and green light unpolarized;

third means stationed along said optical path adjacent said second dichroic polarizer for selectively varying the rotation of linearly polarized light continuously from 0-degrees to 90-degrees; and a third dichroic polarizer stationed along said optical path adjacent said third means, said third dichroic polarizer including a yellow dye and structured to plane polarize blue light while transmitting green and red light unpolarized, said dichroic polarizers, said plane polarizer and said first through third means being arranged along said optical path in a predetermined azimuthal orientation to modify the spectral content of visible light incident to said filter so that said filter transmits any one of a gamut of colored light whose saturation and hue are related to the angles through which said first through said third means are selected to rotate the plane of polarization of plane polarized light incident, respectively, thereto.

29. The filter of claim 28 wherein each of said dichroic polarizers is arranged with respect to said plane polarizer so that any one of said dichroic polarizers in combination with said plane polarizer transmits the entire visible spectrum when the plane of polarization of the light absorbed by said dye polarizer is parallel to the transmission axis of said plane polarizer and transmits its designated color by absorbing the complement thereof when the plane of polarization of the absorbed light is crossed with the transmission axis of said plane polarizer.

30. The filter of claim 29 wherein said dichroic polarizer and said plane polarizer are positioned with respect to one another with their polarizing transmission axes at angular increments of 90-degrees azimuth.

31. The filter of claim 28 additionally including a mirror arranged on one side thereof so that light transmitted through said filter is intercepted by said mirror and reflected thereby, so that at least a portion of the light incident on said mirror is retroreflected thereby back through said filter.

* * * * *